Dec. 6, 1938.     N. L. ALISON     2,139,107
HYDRAULIC COUPLING
Filed April 29, 1937     5 Sheets-Sheet 1
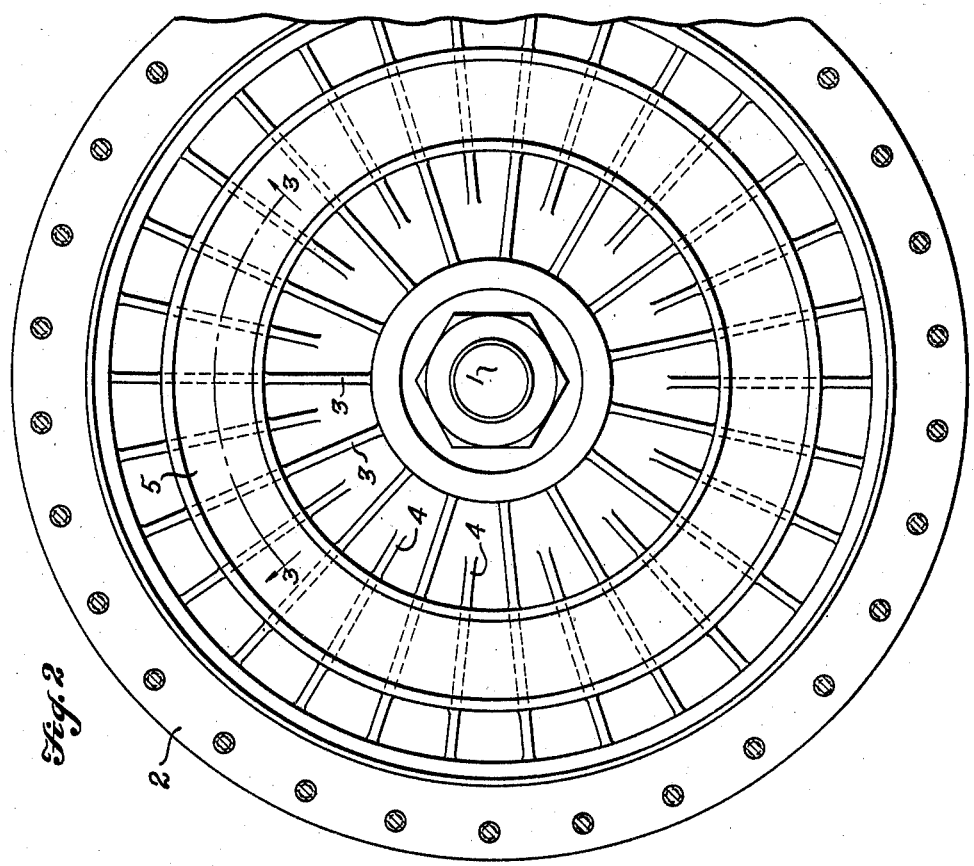
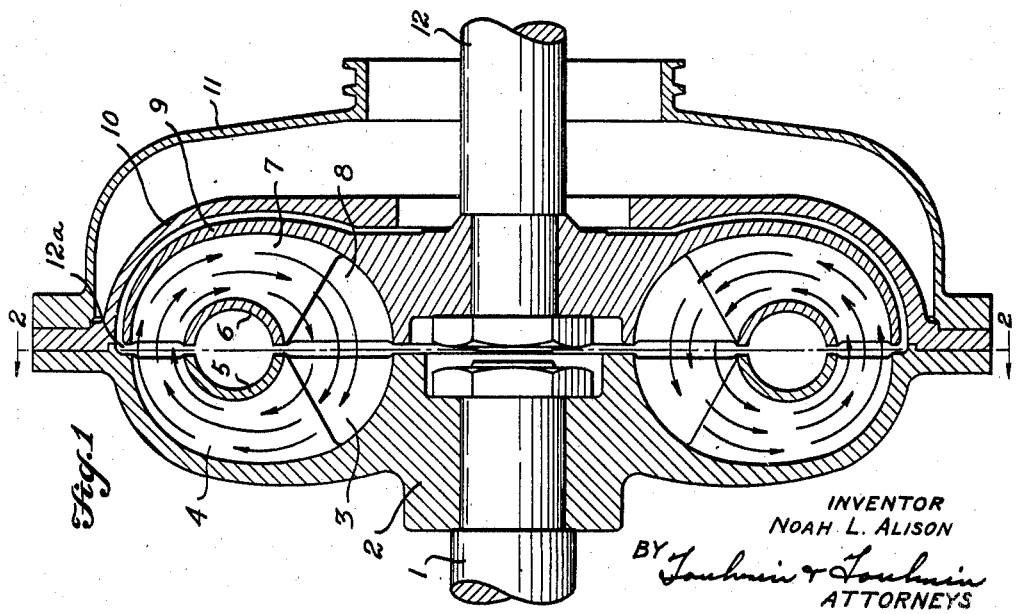
INVENTOR
NOAH L. ALISON
ATTORNEYS Dec. 6, 1938.  N. L. ALISON  2,139,107
HYDRAULIC COUPLING
Filed April 29, 1937  5 Sheets-Sheet 2
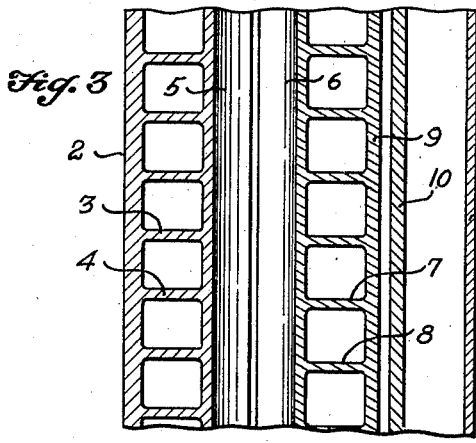
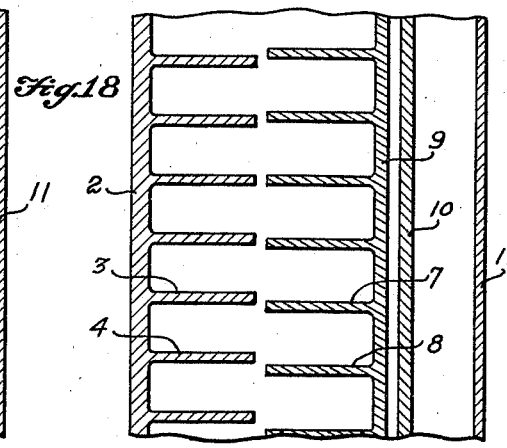
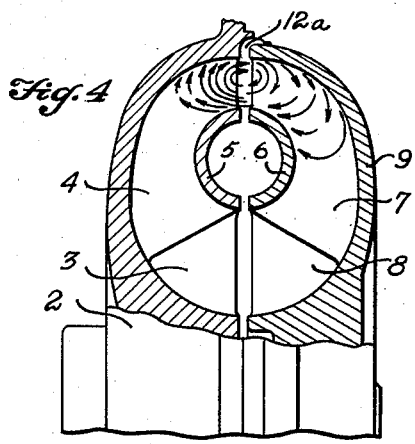
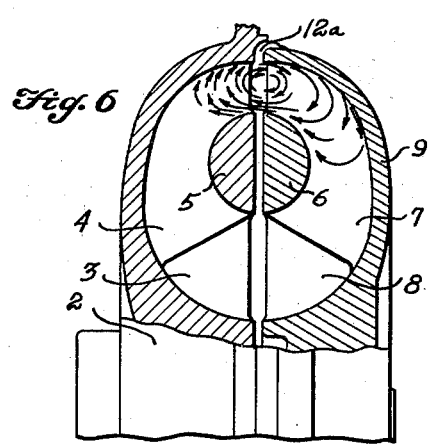
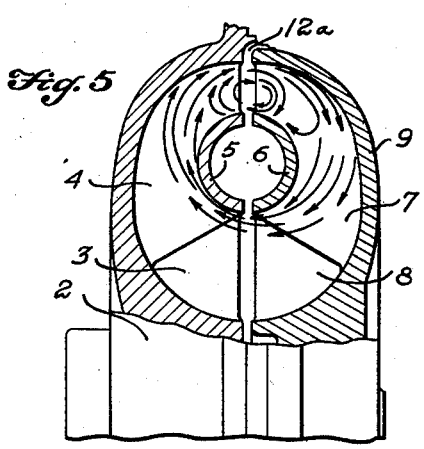
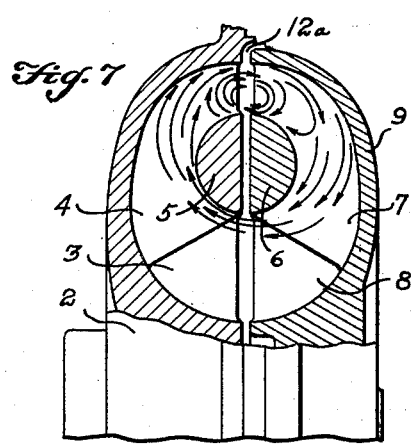
INVENTOR
NOAH L. ALISON
BY Toulmin & Toulmin
ATTORNEYS Dec. 6, 1938.   N. L. ALISON   2,139,107
HYDRAULIC COUPLING
Filed April 29, 1937   5 Sheets-Sheet 3

INVENTOR
NOAH L. ALISON
BY
ATTORNEYS

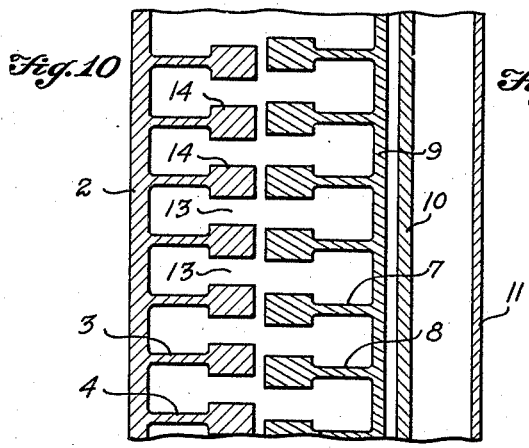
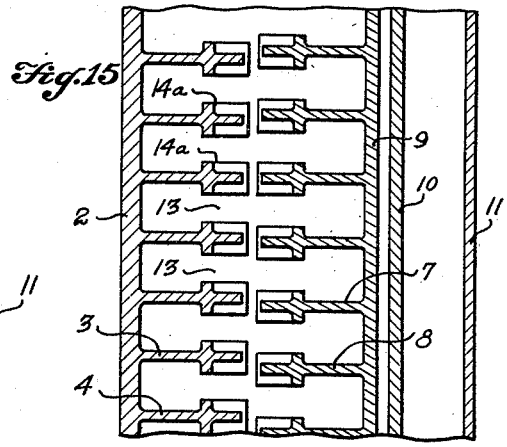
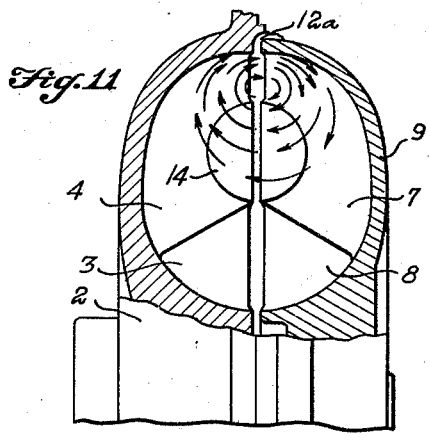
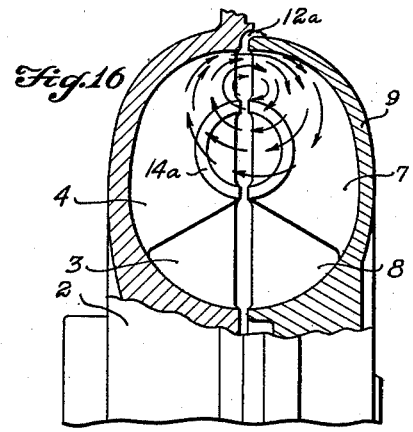
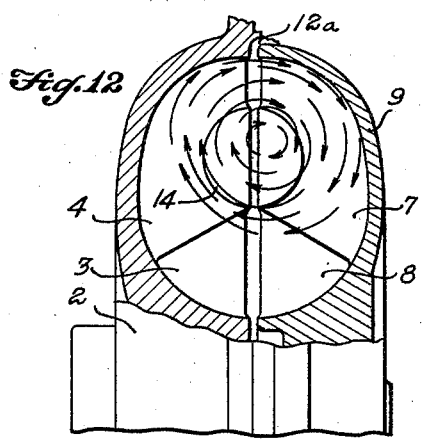
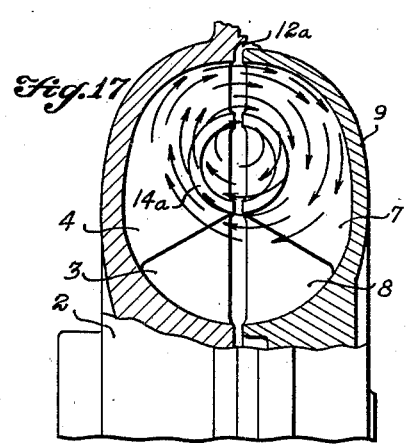

Dec. 6, 1938.   N. L. ALISON   2,139,107
HYDRAULIC COUPLING
Filed April 29, 1937   5 Sheets-Sheet 5
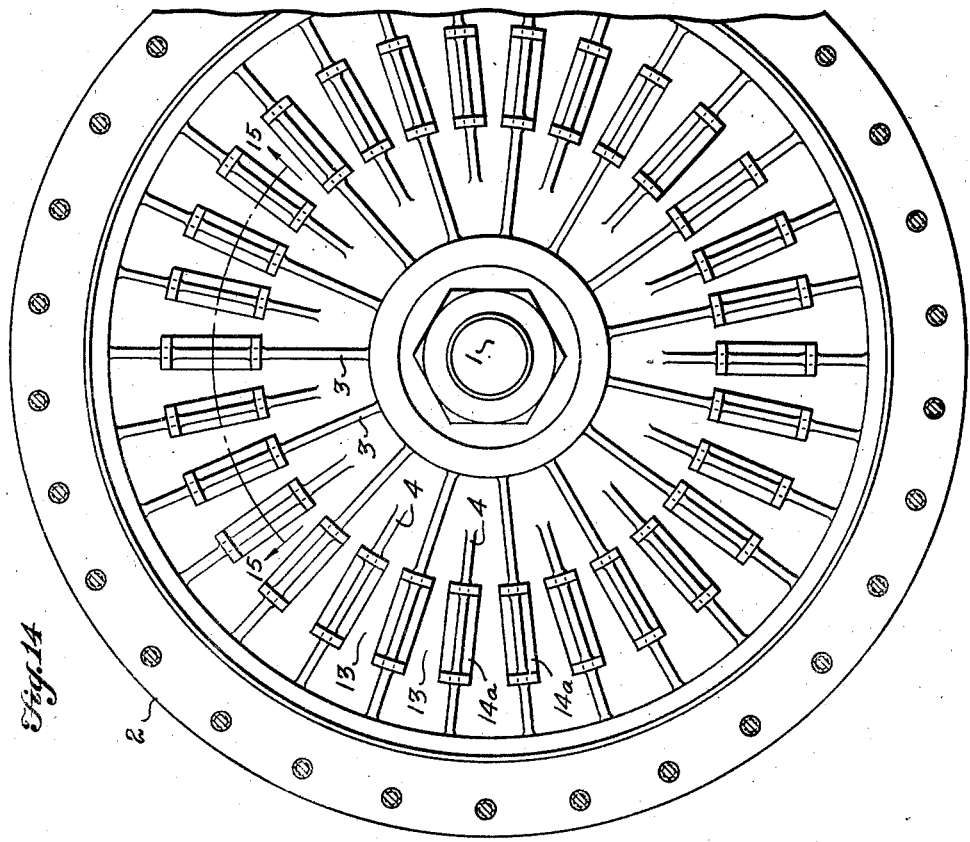
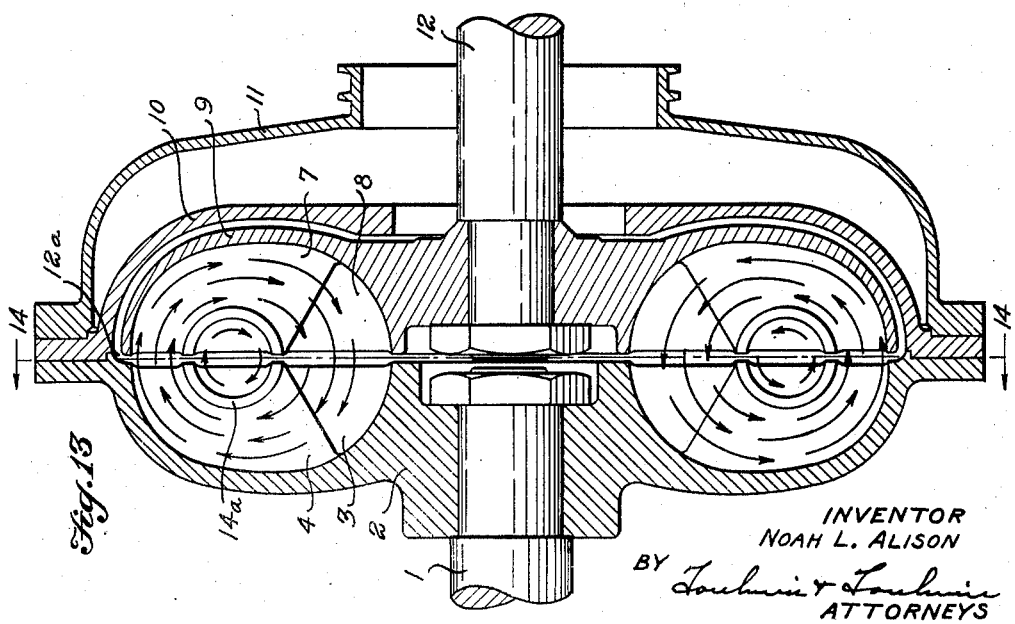
INVENTOR
NOAH L. ALISON
ATTORNEYS Patented Dec. 6, 1938

2,139,107

UNITED STATES PATENT OFFICE 2,139,107

HYDRAULIC COUPLING

Noah Lester Alison, Detroit, Mich., assignor to American Blower Corporation, Detroit, Mich., a corporation of Delaware Application April 29, 1937, Serial No. 139,766
In Great Britain October 28, 1936

11 Claims. (Cl. 60—54)

My invention relates to hydraulic couplings and in particular to variable speed hydraulic couplings.

My invention particularly relates to hydraulic couplings of the kinetic type comprising an impeller member having radial or partly radial vanes co-axial with and juxtaposed to a runner member also having radial or partly radial vanes, these members together forming a toroidal working circuit for the coupling liquid.

It is the object of my invention to eliminate the undesirable characteristic known as the "flat spot", which means that the relation between speed and the amount of oil in the coupling is not a straight line on a graph indicating these relationships. This condition causes serious trouble in connection with the automatic control of hydraulic couplings. It is the object of this invention to eliminate such objectionable conditions so that the relationship between the speed and the amount of oil in the coupling will be suitably maintained.

This condition is brought about by the presence of the core ring in variable speed hydraulic couplings as heretofore built, the presence of the core ring apparently impeding the flow of the oil in the coupling where the coupling was partially filled, resulting in erratic and undesirable characteristics.

It is an object of my invention to provide a novel construction and method of operation depending thereon which permits of a substantially normal oil movement and a balanced oil movement irrespective of the quantity of oil remaining in the coupling.

It is an object of my invention to provide a slotted core ring.

It is a further object to provide a coupling having a plurality of radial ribs with a complete absence of the core ring.

Referring to the drawings:

Figure 1 is a vertical section through a coupling of the prior art showing a continuous hollow core ring fully filled with liquid.

Figure 2 is a section on the line 2—2 of Figure 1 looking in the direction of the arrows at the impeller with the runner removed showing the continuous core ring.

Figure 3 is a section on the line 3—3 of Figure 2, which view is developed on that section.

Figure 4 is a view of this construction with the body of oil de-formed when only a portion of the oil is in the coupling.

Figure 5 is a similar view to Figure 4.

Figure 6 is a view of another prior art type of coupling with a solid core ring showing the liquid partially emptied from the coupling and deformed.

Figure 7 is a similar view using a solid core ring but with a greater quantity of oil in the coupling.

Figure 10 is a section on the line 10—10 of Figure 9 developed.

Figure 11 is a diagrammatic view of the coupling of my invention showing the symmetrical body of oil with a portion of the oil evacuated from the coupling.

Figure 12 is a similar view with a greater amount of oil within the coupling.

Figure 13 is a modified form of the coupling of my invention in which there are employed spaced, arcuate reinforcing ribs that are cast integral with the radial plates in each half of the coupling.

Figure 14 is a section on the line 14—14 of Figure 13.

Figure 15 is a section on the line 15—15 of Figure 14.

Figure 16 is a diagrammatic view of this modified form of coupling with a portion of the oil evacuated.

Figure 17 is a similar view with a lesser amount of oil evacuated.

Figure 18 is a modified form of the coupling illustrated in a view similar to Figure 15 in which the reinforcing and guiding rib has been eliminated.

Figure 9:
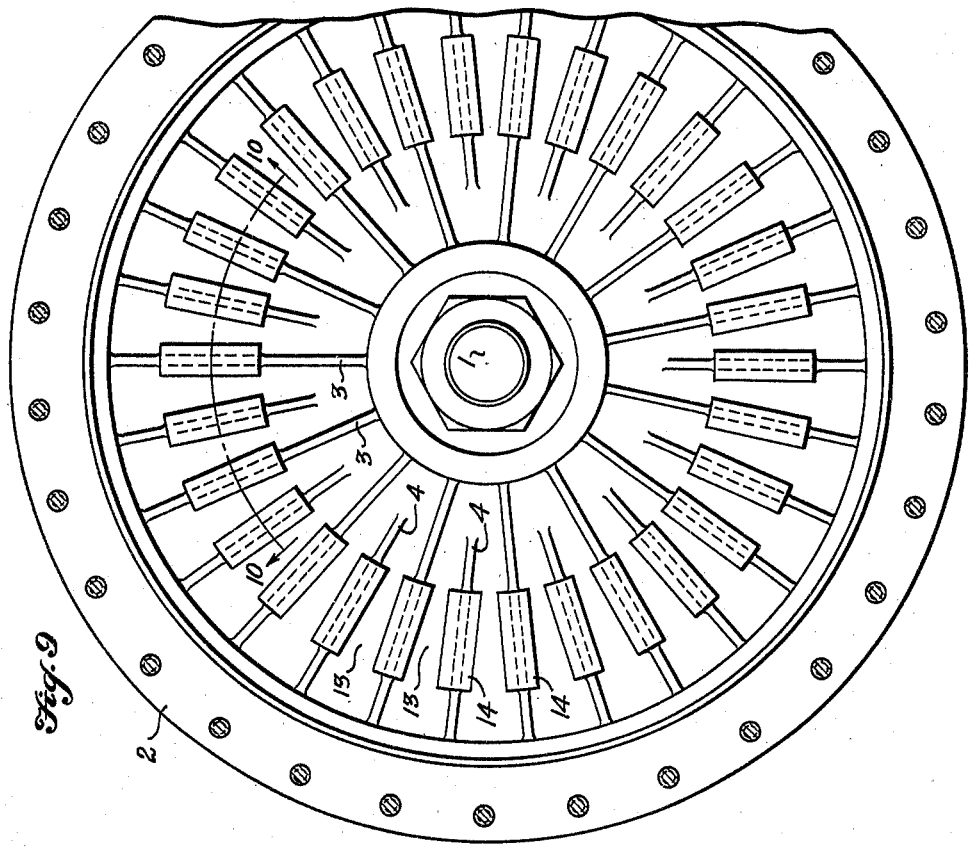
Figure 9 is a section on the line 9—9 of Figure 8 showing the separated ribs with the core ring severed in spaced radial sections.

It is usual to provide prior art couplings with core guide members in the form of two dished rings, mounted respectively on the impeller and the runner vanes, and juxtaposed to form a ring of substantially circular section. Thus the well-known "Vulcan" coupling is provided with core guide rings and the vanes are continued within the core space. In the "Vulcan-Sinclair" coupling, on the other hand, the core space is usually not vaned, and in the case of the scoop-tube type of coupling the two dished core guide rings are usually fitted with flat core-filling plates which seal the interior of the core from the circuit, or the core guide rings are of solid instead of hollow construction.

Such hydraulic couplings have certain objections. For example, where a "Vulcan" or a "Vulcan-Sinclair" coupling, having means whereby the liquid content can be varied during operation, is employed to couple a constant-speed driving motor to a variable-speed load, particularly a load, such as a fan, the torque of which varies as the square of the speed, a flat spot occurs in the curve relating liquid content of the coupling to slip, the slip remaining substantially constant over an appreciable range of filling. This flat spot makes it difficult to regulate the speed of the driven machine rapidly and accurately while the degree of filling passes through this particular range, and difficulties may be encountered when automatic control apparatus is used.

This flat spot effect is also apparent in the torque-slip characteristic curves of such couplings at constant impeller speed when the circuits are partly filled with a constant quantity of liquid, and this renders the couplings in certain applications less convenient for driving a varying load than a coupling having a substantially linear torque-slip characteristic would be.

Another known form of hydraulic coupling having a toroidal working circuit is not provided with core guide members; and although this form has no serious flat spot in its characteristic curve, it suffers from "surging", that is to say, fairly rapid and very large variations in its torque transmission capacity over a critical range of filling when the slip is high. Furthermore, this last form of coupling has a higher slip, other things being equal, than a "Vulcan" and a "Vulcan-Sinclair" coupling, and in consequence its efficiency is lower.

An object of my invention is to provide an improved form of hydraulic coupling in which the objections hereinbefore referred to are reduced or overcome.

According to my invention, a hydraulic coupling of the type set forth comprises a plurality of core guide elements distributed in spaced relation.

According to my invention, a hydraulic coupling.

These elements preferably have the same section—semi-circular, hollow D or solid D—as the known core guide members, the new construction being in effect a known construction with the core guide ring interrupted at intervals round the coupling axis. The improved interrupted core guide ring is preferably provided on both impeller and runner. However, either vaned element may be provided with an interrupted core guide ring and be associated with a vaned element having a normal core guide ring, or without a core guide ring.

Referring to the drawings in detail and in particular to Figures 1 to 7 showing the prior art, it will be noted that the common defect due to the presence of the core ring when there is less than a full quantity of oil in the coupling is that the rotating body of oil is deflected and de-formed, which brings about, as I have discovered after a careful and extended investigation of this condition, the disturbance of the relation between the speed and the amount of oil in the coupling so that it is not a flat straight line on a graph showing this relationship with the result that there is a "flat spot" in this graph.

These drawings illustrate what I discovered, that it is not possible for the oil to circulate through the core guide ring when the coupling is only partially filled. This was discovered after a great many experiments were made, utilizing a wide variety of structures in an endeavor to solve the problem aforementioned.

Figure 8:
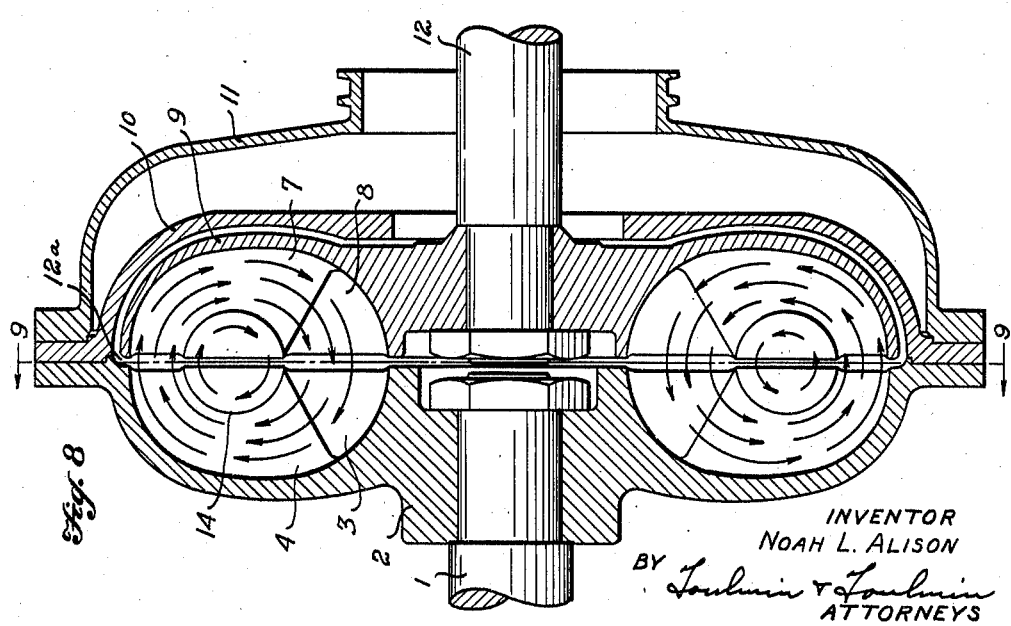
Figure 8 illustrates a vertical section through a coupling of my invention, said section being taken on the line 8—8 of Figure 9.

My invention is set forth in the remaining views, which show the arrangement by which the oil is permitted to pass through from one-half of the coupling to another when partially filled. While it is desirable to maintain in certain installations the general continuity of the core ring, both for the guiding of the oil and for reinforcing the ribs, yet it is possible to utilize my invention without such reinforcements on the ribs. In Figures 8 to 12 a coupling is made with the core ring as in the prior art and the slots are milled through the core ring as indicated. In Figures 13 to 17 the vanes are cast with semi-circular ribs on either side thereof. In Figure 18 the ribs are not provided with any guide rings or reinforcements.

In the prior art constructions there was employed as illustrated in Figures 1, 2 and 3 the usual drive shaft 1 having an impeller 2 with a plurality of radial ribs 3 and 4, midway of which there was a semi-circular core ring 5 that extended continuously around the face of the ribs and matched with a similar semi-circular core ring 6 carried on the ribs 7 and 8 of the runner 9. 10 designates the impeller housing and 11 a casing. 12 designates the runner shaft. It will be understood that the oil makes its exit between the halves of the coupling radially through the space 12a.

As will be noted from the drawings, particularly Figures 4 and 5, when the oil was partially removed from the coupling, the rotating body of the oil, instead of being symmetrical, was deformed into a lopsided or kidney shaped and eccentrically-positioned body of oil, which I discovered brought about the disruption in the relation between speed and the amount of oil in the coupling. This was also brought about by the solid core ring shown in Figures 6 and 7.

In the invention herein disclosed, I have slotted the core ring as at 13 so that each of the guide vanes 3, 4, 7 and 8 will have a section 14 that will be semi-circular, extend partially on either side of the vane, but which will provide free passage between these sections 14 in the passageway 13 for a substantially symmetrical rotation of the oil body, and this symmetrical form substantially remains, irrespective of the quantity of the oil within the coupling, thereby giving a uniform relationship between speed and oil volume in the coupling. Likewise in Figures 13 to 17 where the same principle is employed, the semi-circular ribs 14a are cast on either side of the vanes. In Figure 18 where these ribs are not necessary in certain types of installations, the vanes are entirely free of any reinforcing or guiding ribs.

In operation, when the filling is only partial, the driven half of the coupling will establish a certain speed and with the addition of a small amount of oil this speed will not be materially changed if this oil cannot circulate freely on account of the core guide ring, as in Figures 1 to 7.

However, when sufficient oil was added to bring the level up to that indicated by the arrows in Figure 5, a big change in speed took place due to the fact that at this filling the oil began to break over the core guide ring and form a circuit around it. From that point on the speed increased more or less in direct ratio with the addition of oil. It was found that at the point between the filling shown in Figure 4 and the filling shown in Figure 5 the "flat spot" occurred. The same was true of Figures 6 and 7.

By my invention it is possible for the oil to circulate through the core guide ring when the coupling is only partially filled. The oil can pass through the slots 13 milled out of the core guide ring as in Figures 8 to 12 and circulate freely with any degree of filling. The same thing is also true of the modified forms in Figures 13 to 17 and Figure 18.

This improved coupling has a lower minimum slip than an ordinary "Vulcan" or a "Vulcan-Sinclair" coupling. It has no substantial flat spot at loads which reveal the flat spot with known couplings having core guide members. Its characteristic curve of quantity to slip at constant impeller speed has a better general shape than the corresponding curve of the known couplings, particularly when driving fans and like loads. Furthermore, the improved coupling is less subject to uncontrollable surging, and it is easier to construct owing to simplification of the cores required in casting the vaned elements.

The vanes on which the core guide elements are mounted may be continuous across the ends of these elements, or across them at an intermediate point where an element is longer than a vane interval. The vanes lying in the interruptions preferably extend into the core of the circuit.

It will be understood that I desire to comprehend within my invention such modifications as may be clearly embraced within the claims and scope of my invention.

Having thus fully described my invention, what I claim as new and desire to secure by Letters Patent, is:

1. In a variable speed hydraulic coupling having an impeller and runner with oppositely disposed vanes and a core guide ring, the combination therewith of means constituting cut away core guide portions for permitting the oil to circulate through said core guide ring in a direction substantially parallel to the axis of rotation of said coupling when the coupling is only partially filled with oil.

2. In combination, in a variable speed hydraulic coupling, of an impeller and runner having vanes and a segmental core ring, sections thereof being mounted in apposition to one another to provide liquid passageways between adjacent segments whereby it is possible for the oil to circulate through said core guide ring when the coupling is only partially filled.

3. In combination, in a hydraulic coupling, of an impeller and a runner having radially-disposed vanes, and separated core guide segment means thereon for guiding oil in said coupling in a working circuit, said means being in the form of semi-circular segregated segments so arranged as to make it possible for the oil to circulate therethrough when the coupling is only partially filled with oil to produce a progressive change in the distribution and formation of the liquid vortex body of oil in the coupling so that oil flow is permitted transversely through the core guide space by means of the spaces between the adjacent separated core guide segments.

4. In combination, in a hydraulic coupling, of an impeller and a runner with their respective shafts and oppositely arranged, radially-disposed vanes, and a transversely ported core guide ring so arranged that it is possible for the oil in the coupling to circulate therethrough and from one side of said core guide to the other when the coupling is only partially filled.

5. In combination, in a hydraulic coupling, of an impeller and runner oppositely disposed having radial vanes, and means on each of said vanes comprising semi-circular enlargements circularly disposed on said vanes, with wedge-shaped spaces therebetween whereby it is possible for oil to circulate therebetween when the coupling is only partially filled with oil and to be guided in its rotation between said vanes.

6. In combination, a variable speed hydraulic coupling having an impeller and a runner and shafts therefor, said impeller and runner being provided with a plurality of radially disposed vanes, and segmental spaced radial means on at least a part of said vanes for guiding the oil in the coupling in a rotary path between said guide vanes and so arranged as to permit the rotary movement of the oil transversely across said guiding means when the coupling is only partially filled with oil.

7. In a hydraulic coupling, an impeller and a runner having radially-disposed opposed vanes, and semi-circular slotted means with oil circulating spaces between the adjacent sections mounted on said vanes in apposition one to the other for guiding the oil between the vanes in a substantially symmetrical liquid vortex body in its rotary movement around and between said means so that oil flow is permitted transversely through the core guide space by means of the spaces between the adjacent semi-circular slotted means.

8. In a variable speed hydraulic coupling, the combination of an impeller and a runner having vanes and opposite halves of a core ring slotted to guide the fluid in the working circuit whereby the separate sections of the core ring are carried upon said vanes and the oil flow is permitted transversely through the core guide space by means of the spaces between the adjacent, spaced, core guide ring slotted portions.

9. In a variable speed hydraulic coupling, the combination of an impeller and a runner having radial vanes and a core guide ring at least partially severed transversely of the ring to permit of oil movement transversely of the ring at intervals.

10. In a variable speed hydraulic coupling, the combination of an impeller and a runner having core guide members, at least one of which members is at least partially transversely severed to permit of the transverse movement of oil in the coupling relative thereto.

11. In a hydraulic coupling, the combination of an impeller and runner having vanes and annularly disposed core guide members integral with said vanes; said core guide members being provided with liquid pasageways transversely thereof to permit liquid to pass across the space defined by said core members in a direction substantially parallel to the axis of rotation of said coupling, said passageways thereby effecting a progressive change in the size of the liquid vortex formed around said core guide members when the impeller is rotating and liquid is being introduced or withdrawn from the coupling.

NOAH LESTER ALISON.